United States Patent
Schuetzle

(10) Patent No.: US 9,036,053 B2
(45) Date of Patent: *May 19, 2015

(54) METHOD AND SYSTEM FOR PROCESSING DIGITAL IMAGES HAVING AN ASSOCIATION FILE SEPARATE FROM AN IMAGE LIFE

(75) Inventor: Robert W. Schuetzle, Sacramento, CA (US)

(73) Assignee: LG Display Co., Ltd., Seoul (KR)

( * ) Notice: Subject to any disclaimer, the term of this patent is extended or adjusted under 35 U.S.C. 154(b) by 212 days.

This patent is subject to a terminal disclaimer.

(21) Appl. No.: 13/152,193

(22) Filed: Jun. 2, 2011

(65) Prior Publication Data

US 2011/0234849 A1    Sep. 29, 2011

Related U.S. Application Data

(60) Continuation of application No. 12/725,093, filed on Mar. 16, 2010, which is a division of application No. 10/864,694, filed on Jun. 9, 2004, now Pat. No. 7,714,907, which is a continuation of application No. 09/250,581, filed on Feb. 16, 1999, now Pat. No. 6,762,791.

(51) Int. Cl.
*H04N 5/76* (2006.01)
*H04N 21/418* (2011.01)
(Continued)

(52) U.S. Cl.
CPC ....... *H04N 21/4184* (2013.01); *H04N 1/00244* (2013.01); *H04N 1/32128* (2013.01); *H04N 5/765* (2013.01); *H04N 5/772* (2013.01); *H04N 5/781* (2013.01); *H04N 5/907* (2013.01);
(Continued)

(58) Field of Classification Search
USPC .................. 348/211.99–211.6, 231.99–231.3
See application file for complete search history.

(56) References Cited

U.S. PATENT DOCUMENTS

| 4,001,850 A | 1/1977 | Fujita |
| 4,268,143 A | 5/1981 | Dearing et al. |

(Continued)

FOREIGN PATENT DOCUMENTS

| WO | 9726757 | 7/1997 |
| WO | 9730375 | 8/1997 |

(Continued)

OTHER PUBLICATIONS

Japanese Electronic Industry Development Association Standard, "Recommended EXIF Interoperability Rules" Version 1.0, Jun. 1998, pp. 1-25.

(Continued)

*Primary Examiner* — Tuan Ho
(74) *Attorney, Agent, or Firm* — Morgan, Lewis & Bockius LLP

(57) ABSTRACT

A portable image capture device, program and method for controlling and managing data captured thereby. A device program residing on the portable image capture device generally associates data processing attributes with image files generated for image data captured by the portable image capture device. In some embodiments, the device program associates data processing attributes related to prompts for pre-defined image data with corresponding image files generated in response to the prompts. The device program, and attribute and prompt data therefor are created on a data processing system and are transferrable therefrom to the portable image capture device.

20 Claims, 6 Drawing Sheets

(51) Int. Cl.
- H04N 1/00 (2006.01)
- H04N 1/32 (2006.01)
- H04N 5/77 (2006.01)
- H04N 21/4223 (2011.01)
- H04N 21/81 (2011.01)
- H04N 5/765 (2006.01)
- H04N 5/781 (2006.01)
- H04N 5/907 (2006.01)
- H04N 9/804 (2006.01)
- H04N 9/82 (2006.01)
- H04N 101/00 (2006.01)

(52) U.S. Cl.
CPC ............ H04N9/8047 (2013.01); H04N 9/8205 (2013.01); H04N 21/4223 (2013.01); H04N 21/8153 (2013.01); H04N 2101/00 (2013.01); H04N 2201/0051 (2013.01); H04N 2201/0055 (2013.01); H04N 2201/3242 (2013.01); H04N 2201/3276 (2013.01); H04N 2201/3277 (2013.01)

(56) References Cited

U.S. PATENT DOCUMENTS

| | | | |
|---|---|---|---|
| 4,361,388 | A | 11/1982 | Mlcak et al. |
| 5,060,140 | A | 10/1991 | Brown et al. |
| 5,226,145 | A | 7/1993 | Moronaga et al. |
| 5,266,145 | A | 11/1993 | Duck et al. |
| 5,276,470 | A | 1/1994 | Fridman |
| 5,289,217 | A | 2/1994 | Rosenblatt |
| 5,371,610 | A | 12/1994 | Sugawa |
| 5,434,618 | A | 7/1995 | Hayashi et al. |
| 5,576,758 | A | 11/1996 | Arai et al. |
| 5,630,101 | A | 5/1997 | Sieffert |
| 5,633,678 | A | 5/1997 | Parulski et al. |
| 5,640,204 | A | 6/1997 | Tsutsui |
| 5,642,513 | A | 6/1997 | Schnellinger et al. |
| 5,666,186 | A | 9/1997 | Meyerhoefer et al. |
| 5,668,596 | A | 9/1997 | Vogel |
| 5,687,347 | A | 11/1997 | Omura et al. |
| 5,689,742 | A | 11/1997 | Chamberlain, IV |
| D389,501 | S | 1/1998 | Mascarenas, Sr. et al. |
| 5,706,049 | A | 1/1998 | Moghadam et al. |
| 5,737,491 | A | 4/1998 | Allen et al. |
| 5,745,175 | A | 4/1998 | Anderson |
| 5,764,770 | A | 6/1998 | Schipper et al. |
| 5,790,708 | A | 8/1998 | Delean |
| 5,796,428 | A | 8/1998 | Matsumoto et al. |
| 5,799,082 | A | 8/1998 | Murphy et al. |
| 5,802,219 | A | 9/1998 | Farkas et al. |
| 5,832,133 | A | 11/1998 | Smith |
| 5,835,772 | A | 11/1998 | Thurlo |
| 5,845,084 | A | 12/1998 | Cordell et al. |
| 5,845,161 | A | 12/1998 | Schrock et al. |
| 6,128,038 | A | 10/2000 | Nakajima |
| 6,229,566 | B1 * | 5/2001 | Matsumoto et al. ........ 348/231.2 |
| 6,573,927 | B2 | 6/2003 | Parulski et al. |
| 6,597,468 | B1 | 7/2003 | Inuiya |
| 6,642,959 | B1 | 11/2003 | Arai |
| 6,650,437 | B1 | 11/2003 | Nakajima |
| 6,834,130 | B1 | 12/2004 | Niikawa et al. |
| 6,850,273 | B1 | 2/2005 | Yoshida et al. |
| 2001/0013896 | A1 | 8/2001 | Anderson |

FOREIGN PATENT DOCUMENTS

| | | |
|---|---|---|
| WO | 9736426 | 10/1997 |
| WO | 9738531 | 10/1997 |
| WO | 9801849 | 1/1998 |
| WO | 9813786 | 4/1998 |
| WO | 9817059 | 4/1998 |
| WO | 9818258 | 4/1998 |

OTHER PUBLICATIONS

Japanese Electronic Industry Development Association Standard, "Digital Still Camera Image File Format Standard", Version 2.1, established Nov. 1995, revised Oct. 1998 and Jun. 1998, pp. 1-168.
Annex F of ITU-T Recommendation T.84; ISO/IEC IS 10918-3, Digital Compression and coding of Continuous-tone Still Images—:Extensions, Still Picture Interchange File Format (SPIFF): 22 pgs.
ISO/TC24N 4378, "Photography-Electronic Still Picture Imaging-Removable Memory—Part 2: Image DataFormat—TIFF/EP", Nov. 25, 1998.
ISO/IEC, MPEG-4 Requirements, Version Oct. 9, 1998. IPTC-NAA, "Information Interchange Mosel Guideline 3", pp. 1-14.
Kodak, "Kodak Digital Science, DC2220 NS DC 260 Zoom Cameras, User Guide", pp. 1.1-10.3, A1-A17, W1-W3, and I1-I13.
SanDisk, CompactFlash Memory card User Guider, 1997, pp. 1-6.
FlashPoint Technology, Inc. Digita Script Guide, Digital Operating Environment Version 1.0:, Jun. 17, 1998, pp. ii-iv, and 1-24.
FlashPoint Technology, Inc. Digita Script Reference, Digita Operating Environment Version 1.0:, Jun. 17, 1998, pp. ii-iv, and 1-114.
IPTC-NAA, "Information Interchange Mosel Guideline 3", pp. 1-14.
ISO/IEC, MPEG-4 Requirements, Version 9, Oct. 1998.
FujiFilm News Highlights, "Four Companies Propose Digital print Order Formant," Tokyo/Rochester, N.Y., Oct. 26.
DPOF Version 1.10, release by Canon Inc., et al., Jul. 17, 2000.
DPOF (digital Print Order Format) Summary, released by Canon Inc. et al., Oct. 26, 1998.

* cited by examiner

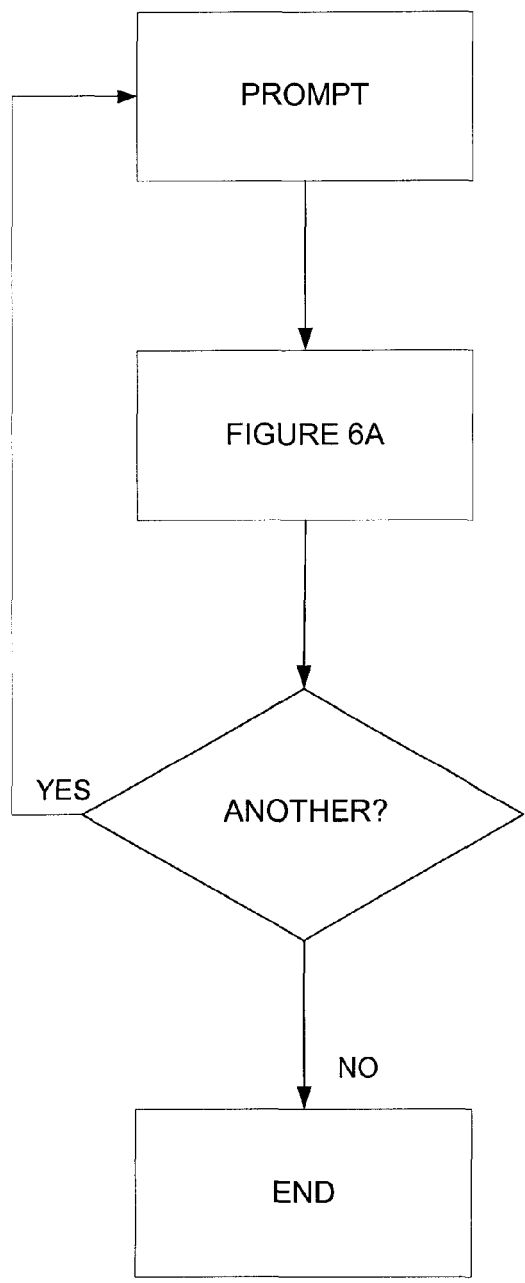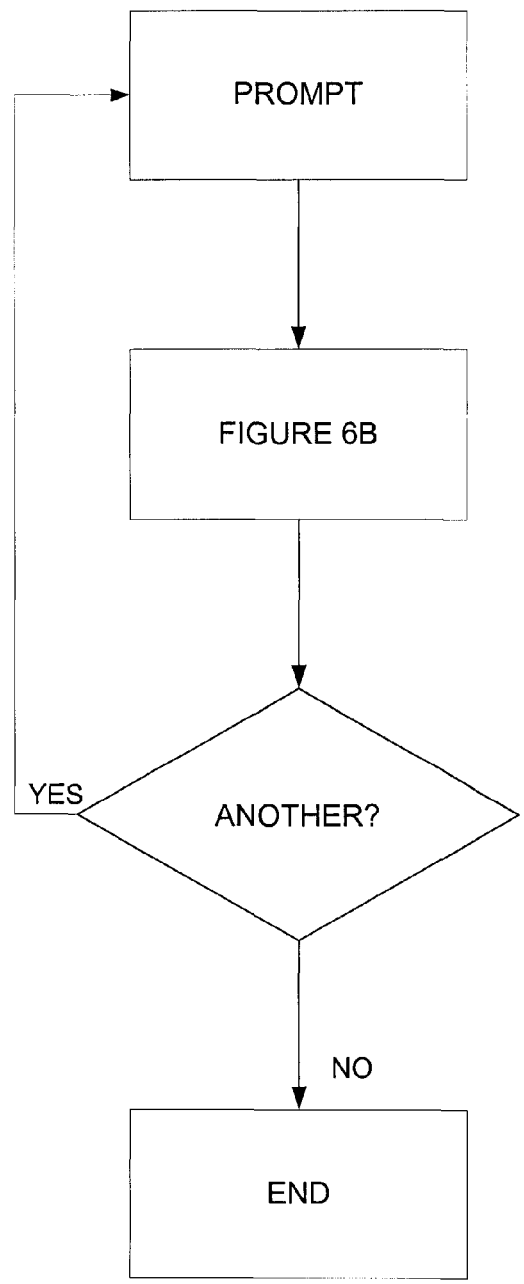
FIGURE 7A  FIGURE 7B

METHOD AND SYSTEM FOR PROCESSING DIGITAL IMAGES HAVING AN ASSOCIATION FILE SEPARATE FROM AN IMAGE LIFE

PRIORITY

This application is a Continuation of U.S. application Ser. No. 12/725,093, filed Mar. 16, 2010, which is a Divisional of U.S. application Ser. No. 10/864,694, filed Jun. 9, 2004, now U.S. Pat. No. 7,714,907, which is a Continuation application of U.S. patent application Ser. No. 09/250,581, filed Feb. 16, 1999 by inventor Robert M. Schuetzle, now U.S. Pat. No. 6,762,791.

BACKGROUND OF THE INVENTION

The invention relates generally to portable image capture devices, and more particularly to controlling and managing data captured by portable image capture devices, computer programs and methods therefor.

Digital still cameras and digital video recorders are known generally, and have revolutionized the acquisition, storage, display, processing and distribution of image data. These devices capture still or moving image data focused onto a light detector, for example a charge-coupled device, and generate corresponding digital image files, which are stored on a data storage medium thereof. The image files are generally viewable as images on a display of the device and are transferrable to a computer for subsequent storage, display, processing and distribution.

The KODAK DIGITAL SCIENCE DC260 digital still camera, for example, generates and stores digital image files corresponding to image data captured thereby in a removable memory storage device thereof known as a flash memory card.

The image files may be viewed on a liquid crystal display of the camera, and may be transferred to other cameras and to data processing systems by an RS-232 or USB serial cable, or by an infrared transceiver, or by removing the flash memory card and inserting it into a compatible memory card adapter on another device or system.

Many portable image capture devices operate on a programmable software operating system that may also run application programs. In the past, these operating systems were largely proprietary, but more recently there has been a trend toward standardized, non-proprietary operating systems in portable image capture devices. The KODAK DC260 camera, for example, operates on an industry standard DIGITA operating system, which is programmable to control various camera settings like image resolution, and to select different modes of camera operation, for example capture or review or connect modes. The DIGITA operating system and other standard operating systems may also be used on other portable still or moving image capture devices, including digital video capture devices.

The KODAK DC260 camera also executes application programs, and more particularly DIGITA-compatible script files downloaded onto the camera. The script files also may be used to configure camera settings, and to prompt the user, via visual display prompts, to perform certain actions, for example to capture pre-specified image data. The FLASH-POINT DIGITA Script Guide, Digita Operating Environment Version 1.0, dated 17 Jun. 1998, for example, discloses an exemplary script entitled "Guided Capture" executable on the KODAK DC260 camera that displays visual prompts for the capture of a sequence of pre-specified pictures.

The DIGITA-compatible script files executable on the KODAK DC260 camera are created by a DIGITA script development program or a text editor program on a general purpose computer and then down-loaded or otherwise transferred to the digital camera by the serial cable or transceiver or flash memory card, as discussed generally above. See also, International Publication No. WO 97/30375, published 21 Aug. 1997, entitled "Method and Apparatus for Configuring a Camera Through External Means", which discloses generally the transfer of application programs and data base information from a computer to digital and film based cameras for configuring the operating system and operational parameters thereof and for identifying image data captured thereby.

It is known generally to add watermark or label information, including time and date information, to image data captured by still and video cameras. This information is generally overlaid on the image or on a perimeter thereabout for viewing with the image. The KODAK DC260 camera, for example, includes a watermark feature that permits the addition of time, date, logos and user defined textual information to images captured thereby. In the KODAK DC260 camera, the watermark data is stored as part of the corresponding image data file and is integrated, or associated, therewith during image capture for viewing with the image. When the watermark feature is enabled on the KODAK DC260 camera, the selected watermark is associated with each image captured, until the watermark feature is disabled. The selected watermark must also be changed prior to capturing each image if a different watermark is desired for different images, for example to provide descriptive text that uniquely identifies each image.

It is also known generally to store audio data in association with image data captured by portable image capture devices. This feature is inherent in most video devices. In the KODAK DC260 camera, sound clips may be recorded after the image data is captured, and then attached to the corresponding image file after the image file is stored in memory. See also, International Publication No. WO 98/17059, published 23 Apr. 1998, entitled "A Method and System For Adding Sound To Image In A Digital Camera".

Digital image data files have standardized formats and permit saving non-image data in user definable attribute storage portions thereof, as is known generally. Still images image file formats include for example the EXIF, SPIFF, TIFF and JPEG formats, and video image file formats include for example the MPEG format. Thus user defined non-image data and other data related to image files may be saved in portions of the image file specifically designated therefor.

International Publication No. WO 97/26757 published 24 Jul. 1997 entitled "Electronic Digital Camera with Image Identification", International Publication No. WO 98/30375, published 21 Aug. 1997, entitled "Method and Apparatus for Configuring a Camera Through External Means", and International Publication No. WO 98/18258, published 30 Apr. 1998, entitled "System and Method for Correlating Processing Data and Image Data Within A Digital Camera Device", among others, disclose generally the storage of user defined image identification data in association with images captured by digital and film base cameras.

International Publication No. WO 97/30375 entitled "Method and Apparatus for Configuring a Camera Through External Means" discloses identifying image data stored on the camera with data base information transferred thereto from a computer, as discussed generally above.

The present invention is drawn toward advancements in the art of portable image capture devices, computer programs and methods therefor, and combinations thereof.

An object of the invention is to provide novel portable image capture devices, computer programs and methods therefor, and combinations thereof that overcome problems in the art.

Another object of the invention is to provide novel computer programs and methods for controlling the capture and management of image data in portable image capture devices, and combinations thereof.

Another object of the invention is to provide novel portable image capture devices, computer programs and methods therefor, and combinations thereof for improving the processing of image data captured thereby and especially upon transfer of the captured data to a data processing system.

A further object of the invention is to provide novel device computer programs for portable image capture devices and methods therefor for associating data processing attributes with image files generated for image data captured by the portable image capture device.

A further object of the invention is to provide novel device computer programs for portable image capture devices and methods therefor that allow an operator of the device to selectively associate data processing attributes with image files generated for image data captured by the portable image capture device.

A further object of the invention is to provide novel device computer programs for portable image capture devices and methods therefor that automatically associate data processing attributes with image files generated for image data captured by the portable image capture device.

Another object of the invention is to provide novel device computer programs for portable image capture devices and methods therefor for associating data processing attributes related to prompts for pre-defined image data with corresponding image files generated in response to the prompts.

Still another object of the invention is to provide novel system computer programs and methods therefor for generating device programs transferrable to portable image capture devices.

Yet another object of the invention is to provide novel system computer programs and methods therefor for generating data processing attribute data and prompt data transferrable to portable image capture devices.

These and other objects, aspects, features and advantages of the present invention will become more fully apparent upon careful consideration of the following Detailed Description of the Invention and the accompanying Drawings, which may be disproportionate for ease of understanding, wherein like structure and steps are referenced generally by corresponding numerals and indicators.

BRIEF DESCRIPTION OF THE DRAWINGS

FIG. 7a is a process flow diagram for prompting for the capture of pre-defined image data on a portable image capture device.

FIG. 7b is an alternative process flow diagram for prompting for the capture of pre-defined image data on a portable image capture device.

DETAILED DESCRIPTION OF THE INVENTION

Figure 1:
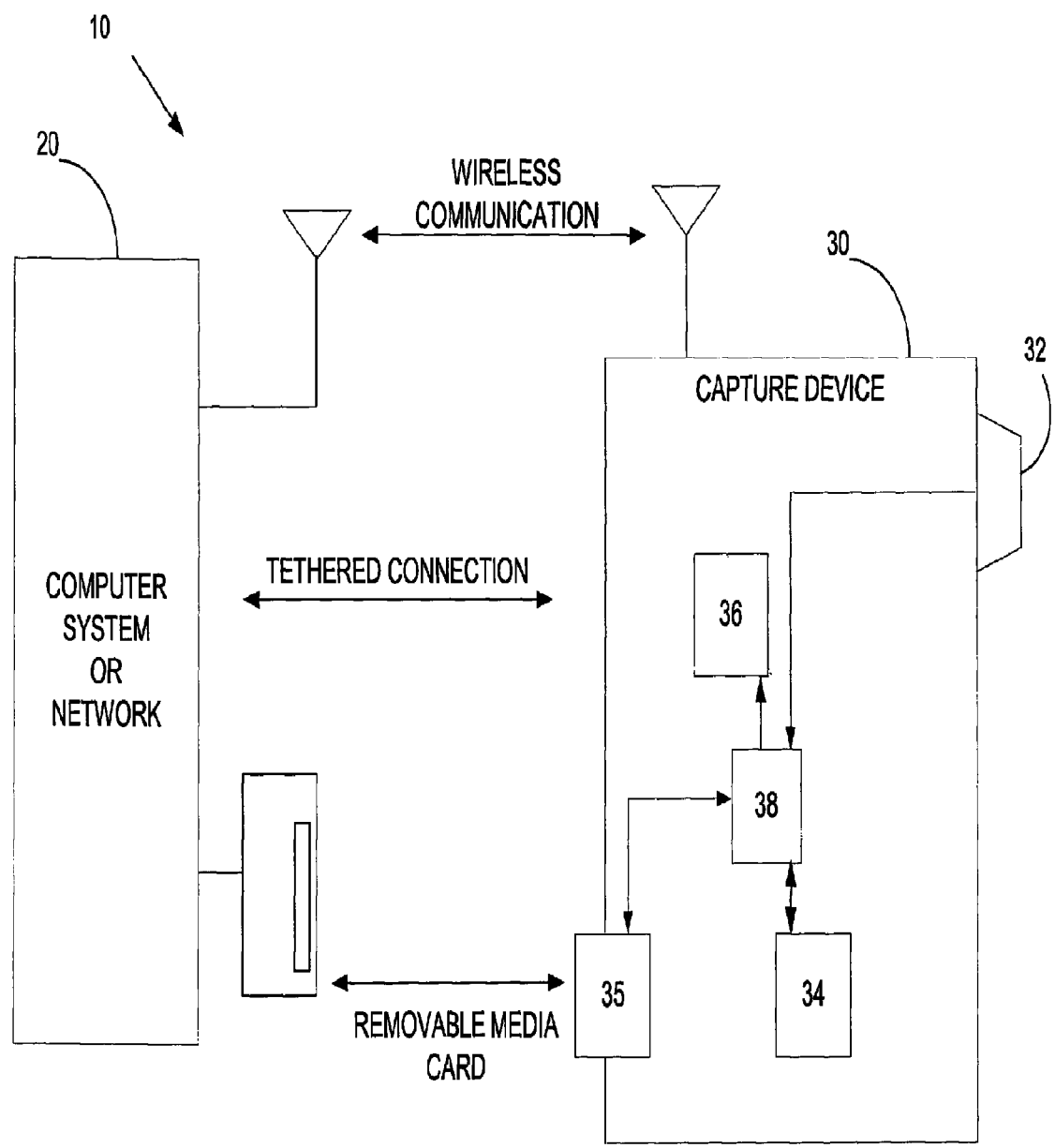
FIG. 1 is a diagrammatic view of a system for controlling and managing image data captured by portable image capture devices.

FIG. 1 is a diagrammatic view of a system 10 including a data processing system 20, for example a computer system or a network of computer systems, for controlling and managing data captured by a portable image capture device 30.

Information is communicated between the data processing system 20 and the portable image capture device 30 by one or more of any known communication means. Communication may be by wireless signal transmission, for example in the infrared or radio signal frequency ranges, and/or by signal transmission through a tethered connection, for example parallel or serial cables, and/or by transferring data stored on a removable media card, for example a magnetic data storage diskette or a non-magnetic data storage card like a flash memory card, as is known generally.

The portable image capture device 30 is preferably a digital image capture device, for example a digital still camera or a digital video recorder or a digital infrared or ultraviolet or some other imaging device. FIG. 1 illustrates the device 30 comprising generally a data input device 32 for detecting or accepting data input, for example a light detector for capturing image data. In some embodiments, the device 30 is also capable of detecting audio and/or textual data input for capture with the image data and/or for storage in association with the image data. The data input device 32 is thus representative generally of one or more data input devices for detecting or accommodating different types of input data, including image data, audio data, textual data, and other types of data.

FIG. 1 also illustrates the portable image capture device 30 comprising a data storage medium 34 for storing image files corresponding to image data captured thereby, and for storing data files. The device 30 may also include a removable data storage medium 35 in place of, or in combination with, the data storage medium 34.

The device 30 also includes an indicator 36, for example a visual display, to facilitate the capture of images and for viewing image files. The indicator 36 may also signal the operator of the device 30 to perform certain tasks, and may be used by the operator to assign data processing attributes to image files, as discussed further below. The device 30 includes hardware and/or software controlled processing means 38 for controlling operation thereof and for generating image files corresponding to image data detected or captured by the device 30. The device 30 also has means for communicating with the data processing system 20, as discussed above.

In an exemplary application, the portable image capture device 30 is a KODAK DIGITAL SCIENCE DC260 digital camera, which is widely available commercially from authorized retailers for the Eastman Kodak Company. The KODAK DC260 and other digital camera and digital video recorders include generally an image detecting device coupled to a processor that generates digital image files corresponding to image data captured by the camera, as discussed generally above. The KODAK DC260 camera includes a removable flash memory card for storing data and image files generated for images captured thereby, and an LCD display for displaying images and menu based information. The KODAK DC260 camera also includes an audio input device for inputting audio data and a keypad shuttle feature for inputting textual data, both of which are storable on the data storage medium in association with the image file.

The portable image capture device 30 preferably includes a software programmable operating system for the control thereof and for executing application programs stored on the memory storage device thereof, as is known generally. The KODAK DC260 camera of the exemplary embodiment for example operates on the industry standard DIGITA operating system, and is programmable to control various camera settings like image resolution, and to select different modes of operation, for example capture or review or connect modes. The KODAK DC260 camera also executes application programs, and more particularly DIGITA-compatible script files downloaded onto the camera by the removable flash memory card or by a USB or RS-232 serial cable or by infrared wireless communications.

According to the invention, generally, a device program is stored in a program storage memory of the portable image capture device. The device program includes an attribute program segment that provides one or more data processing attributes associatable with an image file generated for image data captured by the portable image capture device. The device program also includes an association program segment that associates one or more data processing attributes provided by the attribute program segment with an image file generated for image data captured by the portable image capture device. The device program may be a self executable file or may be another program including among others a file, or library, or driver, or other program, and in one embodiment is a DIGITA-compatible script file.

The data processing attributes associated with the image files are used subsequently and ultimately for processing the image files, usually upon transfer of image files and the data processing attributes to the data processing system or network. Some processing may also occur on the portable image capture device. The processing of the image files may include routing, sorting, storing, renaming and other general data processing operations. Additionally, the processing of the image files may include image file processing procedures more conventionally associated with image files, including image cropping, and the control of contrast, resolution and other parameters.

Figure 2A:
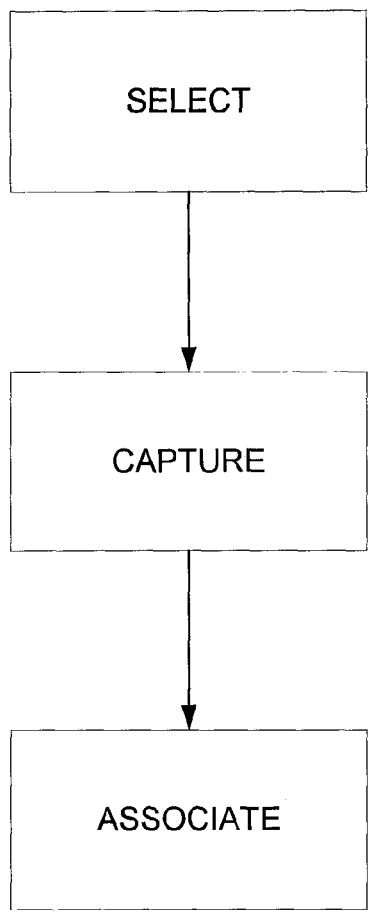
FIG. 2a is a process flow diagram for selecting and associating a data processing attribute with an image file.
Figure 2B:
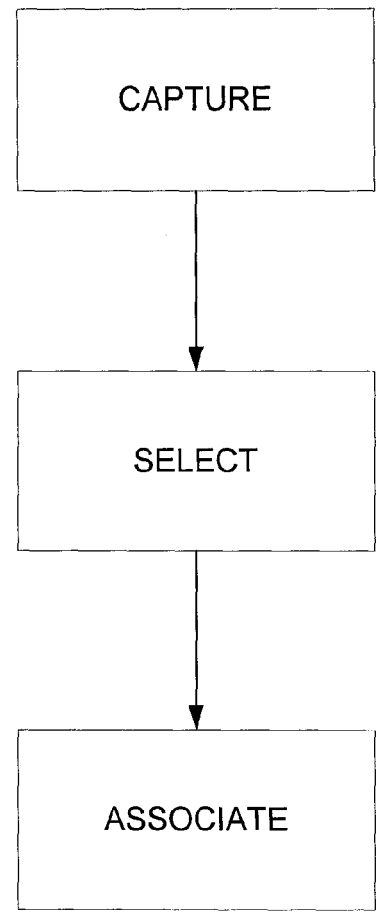
FIG. 2b is an alternate process flow diagram for selecting and associating a data processing attribute with an image file.

The data processing attributes are generally pre-defined in a template or list or data base or document or other file stored on the data storage medium of the portable image capture device. The data processing attributes are provided, by the association program segment, for association with an image file in response to selection or identification of the attribute by the device operator or by the device program. In the process flow diagram of FIG. 2a, selection occurs before the capture of image data, and in the process flow diagram of FIG. 2b selection occurs after the capture of image data.

In one embodiment, the device program includes a select program segment that allows an operator of the device 30 to select a data processing attribute to be associated with an image file from a template or list of selectable attributes, which is displayed on a visual display of the device 30. In another embodiment, the data processing attributes are selected by the device program automatically and without input by the operator as discussed further below. In still other embodiments, some attributes are selected for association with an image file by the operator either before or after image capture, and other attributes are selected automatically by the device program so that the image file has multiple attributes associated therewith.

Figure 3:
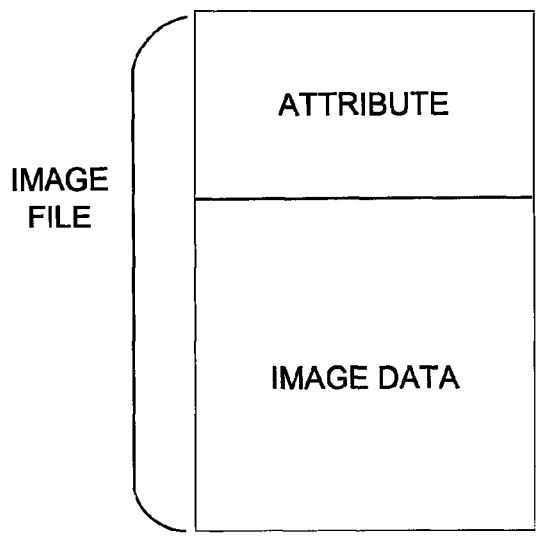
FIG. 3 illustrates one means for associating a data processing attribute with an image file.

In one embodiment, illustrated in FIG. 3, the association program segment of the device program associates the data processing attribute with the image file by writing a data processing attribute to an attribute storage portion of an image file. Many standard image data file formats, examples of which are discussed above, include user definable attribute storage portions, which may be used for this purpose.

Figure 4:
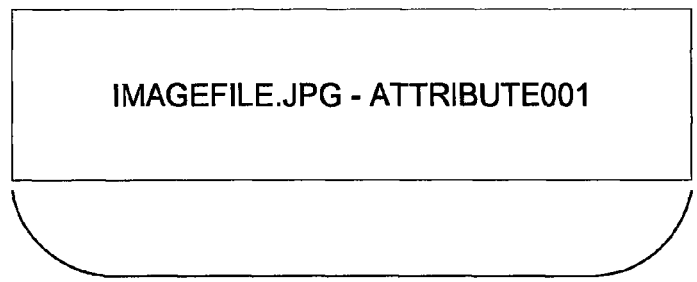
FIG. 4 illustrates another means for associating a data processing attribute with an image file.

In an alternative embodiment, illustrated in FIG. 4, the association program segment of the device program associates the data processing attribute with the image file by generating a separate association file relating the data processing attribute and the image file. The association file, for example, may associate the data processing attribute, for example ATTRIBUTE001, with the file name of the image file, for example IMAGEFILE.JPG, or some other unique image file information. Other association files may include a data base file or a document file or other data file that associates or relates the data processing attribute and image file information.

Figure 5:
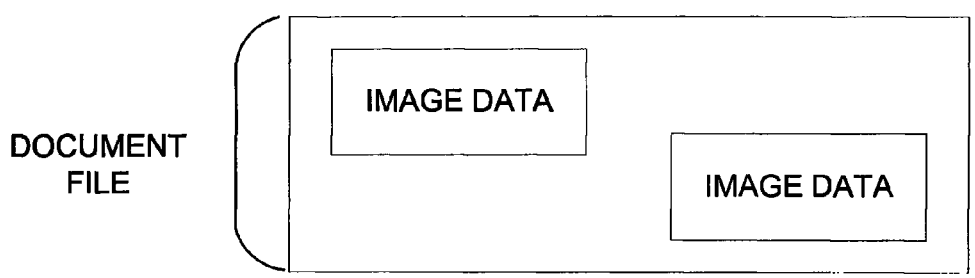
FIG. 5 illustrates still another means for associating a data processing attribute with an image file.

In yet another alternative embodiment, illustrated in FIG. 5, the association program segment of the device program associates the data processing attribute with the image file by writing the image file to a document file stored on the portable image capture device based on the data processing attribute provided by the attribute program segment. The data processing attribute for example may include an address or instruction, or invoke a function or subroutine that causes the image file associated therewith to be written to a document file, and preferably to one or more specific locations or addresses in the document file. In some embodiments, the image file is first stored on the data storage medium of the device and then written therefrom to the document file. And in another embodiment, image file is written directly to the document file without first creating and storing a distinct image file on the data storage medium. The document file for example may be a text file or an Extensible Markup Language (XML) file or some other document file. Generally, multiple image files may be written to and thus integrated with one or more document files.

Figure 6A:
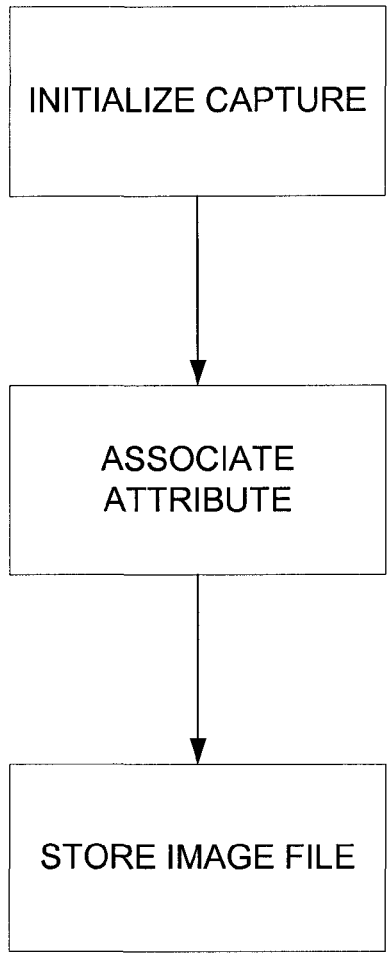
FIG. 6a is a process flow diagram for associating a data processing attribute with an image file.
Figure 6B:
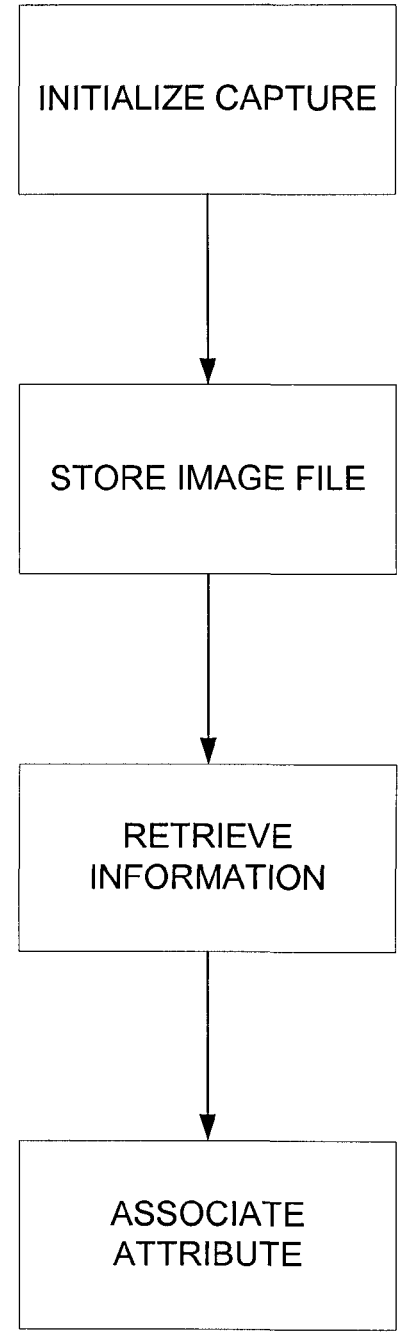
FIG. 6b is an alternative process flow diagram for associating a data processing attribute with an image file.

A data processing attribute may generally be associated with an image file during or after image capture. In the present specification and the claims thereof, image capture is defined to occur during a period between the initialization of capture, for example the actuation of a shutter button on the device, and the storage of an image file generated for the image data captured. In FIG. 6a, the attribute is associated with the image file during image capture, and in FIG. 6b, association occurs after the image file is captured, that is after generation and storage of the image file.

In embodiments where the data processing attribute is associated with the image file after image capture, it may be necessary to obtain or retrieve some information about the image file. In embodiments where the data processing attribute is written to an attribute storage portion of the image file, for example, it may be necessary to retrieve the memory storage address of the stored image file. In applications where a separate association file is generated, it may be necessary to retrieve the name or storage address or some other information about the stored image file for inclusion in the association file. Similar name or storage address or other information about the image file may be required in applications where the image file is written to one or more document files.

Associating the data processing attribute with the corresponding image file during image capture generally requires less time than if the image file is first captured since it is not necessary to wait for the image file to be stored prior to association of the attribute. Associating the attribute with the image file during capture also eliminates the requirement for information retrieval in FIG. 6b. Reducing the association processing time period may be significant, for example in still camera applications where it is desirable to capture a series of images over short time interval. Reducing association processing time permits capturing images at a faster rate.

The image files and the data processing attributes associated therewith, including any association files and document files, are stored generally on one or both of the data storage mediums 34 and 35 of the device 30 for subsequent transfer to a data processing system 20. Alternatively, the image files and attributes associated therewith, including any association files and document files, may be communicated directly to the data processing device 20 upon or during association with the attributes. In this latter mode of operation, the image files and attributes associated therewith are generally stored temporarily or buffered prior to and during transfer to the data processing system 20.

According to another embodiment of the invention, the device program includes a request program segment that signals one or more prompts to capture pre-defined image data with the portable image capture device 30. In the exemplary KODAK DC260 camera application, the prompts are displayed visually an LCD display thereof for interpretation by an operator. In response to each prompt, the operator initializes the capture of image data, generally by training the image capture device 30 on the requested object and then initializing the capture process, by actuating a shutter in a still camera or actuating a record button in a video recorder.

The prompts for pre-defined image data, for example, may be images of a particular parcel of real estate or of a motor vehicle or of an animate object like a human subject, which may be required in connection with real estate transactions or insurance claims or legal actions. In video image recording applications, the pre-defined requests may be more sophisticated since dynamic image data may be stored in each video data file.

The prompt may also request the operator to input audio and/or textual data that identifies an image to be captured prior to capture. According to this mode of operation, the image data to be captured is not identified until the operator identifies the image data through a textual or audio input on the device in response to the prompt. The prompt may also query the operator to input audio and/or textual data, for example descriptive information about an image captured or an image to be captured. The audio and/or textual data, for example, may be information about the object or person that is not capturable as image data. The KODAK DC260 camera and other portable image capture devices have audio and keypad inputs for capturing these additional types data input. The audio and textual data files are stored generally in user definable attribute storage portions of the corresponding image data files generated for the image data captured, or in corresponding data files, which may be related to corresponding image files.

In another embodiment of the invention, the attribute program segment of the device program provides a data processing attribute related to each prompt, and the association program segment associates the data processing attribute related to the prompt with the image file generated for image data captured in response to the prompt. The association of the data processing attribute related to the prompt is performed by the device program automatically and without input by the user. The operator, however, may select one more other data processing attributes for association with the image file either before or after image capture, as discussed above in connection with FIGS. 2a and 2b.

In FIGS. 7a and 7b, a prompt for the capture of pre-defined image data is signalled, for example on a visual display of the device. In response to the prompt, the device operator initializes image capture, as discussed above, whereupon an attribute related to the prompt is associated with the image file by one of the means discussed above in connection with FIGS. 3-5. According to this embodiment, the image file has associated therewith an attribute related to the prompt in response to which the image file was ultimately generated.

In the exemplary KODAK DC260 camera application, the device program is an executable DIGITA script file downloaded onto the removable flash memory device thereof. In the KODAK DC260 camera, several different DIGITA script files may be stored on the removable flash memory card of the camera. The scripts are executable by the device operator, for example upon selection thereof from menus displayed visually on a display device of the device. In other portable image capture device applications, the device program may be written or created in other file or application programming languages.

The image files and the attributes associated therewith, including any association files, are generally transferred from a data storage medium of the portable image capture device 30 to the data processing system 20 as discussed above, preferably by a removable data storage medium 35. In the exemplary KODAK DC260 application, image files are written to a removable flash memory card on the camera, which may be used to transfer data to the data processing system 20. The KODAK DC260 camera also includes data transfer software useable for other modes of transfer.

Figure 8:
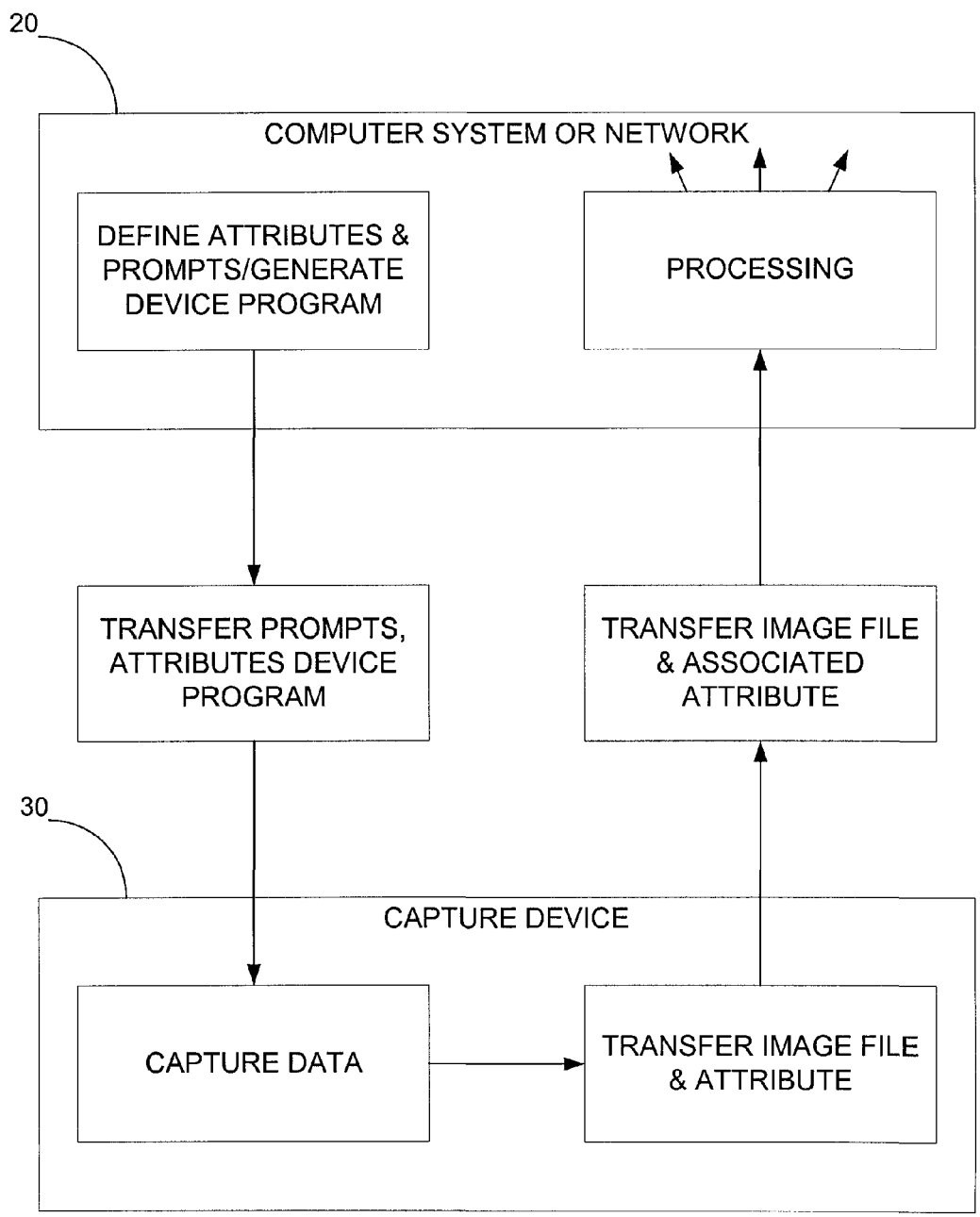
FIG. 8 is a system and process flow diagram for controlling and managing image data captured by portable image capture devices.

In FIG. 8, the device program is generated by a system computer program stored on a computer-readable medium and executable on a data processing system 20. The system program comprises generally a device program segment that generates the device program, which is discussed above, based on user input defining for example data processing attributes and prompts. After generation, the device program is subsequently transferred to a portable image capture device by one of the communication means discussed above, where it is executable by the device 30. The system program may be a JAVA or C based program or other programming language suitable for generating device programs.

According to another embodiment of the invention, the system program includes an attribute data program segment that generates data processing attribute data transferrable to a portable image capture device for use by a device program thereon. The system program may also include a prompt data program segment that generates prompt data transferrable to a portable image capture device. In FIG. 8, the generation of the attribute and prompt data is generally performed on the data processing system 20. The attribute and/or prompt data is subsequently transferred to a portable image capture device for use by a device program residing thereon by any one of the means discussed above and illustrated in FIG. 1.

According to this aspect of the invention, a device program residing on the portable image capture device may be provided with variable attribute and/or prompt data transferred from the data processing system 20. It is not necessary to repeatedly download entire device programs to the portable image capture device to change the attributes and prompt data used thereby. The attribute and prompt data may be changed by merely transferring new attribute and/or prompt data from a data processing system to the portable image capture device 30. This alternative reduces time and costs associated with generating new device programs, and reduces the time required to transfer attribute and prompt data to the portable image capture device, which may be a significant savings, particularly when wireless or serial communication means are employed for the data transfer.

The system computer program, or system program, may also comprise an extraction program segment that extracts the data processing attributes associated with each image file after the image files and attributes associated therewith are transferred from the portable image capture device 30 to the data processing system 20. In one embodiment, the extraction program segment extracts the data processing attribute from the attribute storage portion of the image file, and in another alternative embodiment the extraction program segment extracts the attribute from a corresponding association file, or extracts image data from a document file. The extraction program segment may be an integral part of the system program, or more generally may be a stand alone program that operates separately from the system program.

The system computer program may also comprise a processing program segment, also illustrated in the process flow diagram of FIG. 8, that processes the image files generated for data captured by the portable image capture device based on the data processing attribute associated therewith. The data processing attributes may be used to control sorting, routing, storage and distribution of the image files. The data processing attributes, for example, may be used to rename the image files, or to populate application files or to populate data bases on a data processing system or network. The attributes may be used also to populate document files on a data processing system or network, similar to the use thereof to populate document files residing on the portable image capture device as discussed above. Additionally, data processing attributes may be used to facilitate other image file processing, as discussed generally above.

While the foregoing written description of the invention enables one of ordinary skill to make and use what is considered presently to be the best mode thereof, those of ordinary skill will understand and appreciate the existence of variations, combinations, and equivalents of the specific exemplary embodiments herein. The invention is therefore to be limited not by the exemplary embodiments herein, but by all embodiments within the scope and spirit of the appended claims.

What is claimed is:

1. A portable image capture device that generates a file corresponding to an image data captured thereby, comprising:
   an executable device program stored in a data storage medium of the portable image capture device;
   the device program having a select program segment for a user to associate an attribute program segment that provides a data processing attribute before an image data capture by the portable image capture device; and
   the device program having an association program segment that associates a data processing attribute from the attribute program segment with an image data during image capture and generates a separate association file relating the data processing attribute with the captured image data for storage on the data storage medium,
   wherein the separate association file is generated and stored separate from an image file generated for the image data captured.

2. The portable image capture device of claim 1, further comprising:
   means for transferring an image file and the association file from the data storage medium to a data processing center.

3. The portable image capture device of claim 2, wherein the means for transferring an image file and the association the storage medium includes wireless transfer from the data storage medium to the data processing center.

4. The portable image capture device of claim 3, wherein the executable device program can be selected by selection from menus displayed visually on a display device of the portable image capture device.

5. A portable image capture device that generates a video file corresponding to a dynamic image data captured thereby, comprising:
   an executable device program stored in a data storage medium of the portable image capture device;
   the device program having a select program segment for a user to associate an attribute program segment that provides a data processing attribute before a dynamic image data capture by the portable image capture device;
   and the device program having an association program segment that associates a data processing attribute from the attribute program segment with a dynamic image data during dynamic image capture and generates a separate association file relating the data processing attribute with the captured dynamic image data for storage on the data storage medium,
   wherein the separate association file is generated and stored separate from the video file generated for the dynamic image data captured.

6. The portable image capture device of claim 5, further comprising:
   means for transferring a video file and the association file and the video file from the data storage medium to a data processing center.

7. The portable image capture device of claim 6, wherein the means for transferring an image file and the association the storage medium is wireless transfer from the data storage medium to the data processing center.

8. A portable image capture device that generates an image file corresponding to an image data captured thereby, comprising:
   an executable device program stored in a program storage memory of the portable image capture device;
   the device program having a select program segment for a user to associate an attribute program segment that provides a data processing attribute before an image data capture by the portable image capture device; and
   the device program having an association program segment that associates a data processing attribute from the attribute program segment with an image data during image capture and generates a separate association file relating the data processing attribute with the captured image data for storage on a secondary data storage medium,
   wherein the separate association file is generated and stored separate from the image file generated for the image data captured.

9. The portable image capture device of claim 8, wherein the select program segment has a selection menu displayed visually on a display device of the portable image capture device.

10. A portable image capture device that generates a video file corresponding to dynamic image data captured thereby, comprising:
    an executable device program stored in a program storage memory of the portable image capture device;

the device program having a select program segment for a user to associate an attribute program segment that provides a data processing attribute before a dynamic image data capture by the portable image capture device; and the device program having an association program segment that associates a data processing attribute from the attribute program segment with a dynamic image data during dynamic image capture and generates a separate association file relating the data processing attribute with the captured dynamic image data for storage on a secondary data storage medium, wherein the separate association file is generated and stored separate from the video file generated for the dynamic image data captured.

11. The portable image capture device of claim 10, wherein the select program segment has a selection menu displayed visually on a display device of the portable image capture device.

12. A device computer program stored on a non-transitory computer readable medium and executable on a portable image capture device, wherein the portable image capture device generates an image file for image data captured thereby and stores the image file on a data storage medium thereof, the device program comprising:

a select program segment for a user to associate an attribute program segment that provides a data processing attribute before an image data captured by the portable image capture device; and an association program segment that associates a data processing attribute from the attribute program segment with image data during image capture and generates a separate association file relating the data processing attribute with the captured image data, wherein the separate association file is generated and stored separate from the image file generated for the image data captured.

13. The device computer program of claim 12, further comprising:

a transfer program for transferring an image file and the association file and the image file from the data storage medium to a data processing center.

14. A device computer program stored on a non-transitory computer-readable medium and executable on a portable image capture device, wherein the portable image capture device generates a video file for dynamic image data captured thereby and stores the video file on a data storage medium thereof, the device program comprising:

a select program segment for a user to associate an attribute program segment that provides a data processing attribute before a dynamic image data capture by the portable image capture device; and an association program segment that associates a data processing attribute from the attribute program segment with dynamic image data during dynamic image capture and generates a separate association file relating the data processing attribute with the captured dynamic image data, wherein the separate association file is generated and stored separate from the video file generated for the dynamic image data captured.

15. The device computer program of claim 14, further comprising:

a transfer program for transferring a file of the dynamic image data and the association file from the data storage medium to a data processing center.

16. A method of controlling and managing the capture of image data by a portable image capture device, comprising:

providing data processing attributes into a data storage medium of the portable image capture device;

selecting using a select program segment to associate an attribute program segment that provides a data processing attribute before an image data capture by the portable image capture device;

capturing an image as image data;

associating at least one of the data processing attributes from the selected attribute program segment with image data during capture of the image data; and storing the image data in an image file on a removable data storage medium, and storing a separate association file relating the at least one data processing attribute and the stored image file on the data storage medium, wherein the separate association file is generated and stored separate from the image file generated for the image data captured.

17. A method of controlling and managing the capture of image data by a portable image capture device, comprising:

providing data processing attributes associatable with image data captured by the portable image capture device into program storage memory of the portable image capture device;

selecting using a select program segment to associate an attribute program segment that provides a data processing attribute before an image data capture by the portable image capture device;

capturing an image as image data;

associating at least one of the data processing attributes from the selected attribute program segment with image data during capture of the image data; and storing the image data in an image file on a removable data storage medium, and storing a separate association file relating the at least one data processing attribute and the stored image file on a removable storage medium, wherein the separate association file are generated and stored separate from the image file generated for the image data captured.

18. A method of controlling and managing the capture of image data by a portable image capture device, comprising:

providing data processing attributes into a data storage medium of the portable image capture device;

selecting using a select program segment to associate an attribute program segment that provides a data processing attribute before a dynamic image data capture by the portable image capture device;

capturing a dynamic image as dynamic image data;

associating at least one of the data processing attributes from the selected attribute program segment with dynamic image data during capture of the dynamic image data; and storing the dynamic image data in a video file on a secondary data storage medium, and storing a separate association file relating the at least one data processing attribute and the stored video file, wherein the separate association file is generated and stored separate from the video file generated for the dynamic image data captured.

19. A method of controlling and managing the capture of image data by a portable image capture device, comprising:

providing data processing attributes associatable with dynamic image data captured by the portable image capture device into program storage memory of the portable image capture device;

selecting using a select program segment to associate an attribute program segment that provides a data processing attribute before a dynamic image data capture by the portable image capture device;

capturing a dynamic image as dynamic image data;

associating at least one of the data processing attributes from the selected attribute program segment with the dynamic image data during capture of the dynamic image data; and storing the image data in a video file on a secondary data storage medium, and storing a separate association file relating the at least one data processing attribute and the stored video file, wherein the separate association file is generated and stored separate from the video file generated for the dynamic image data captured.

20. A portable image capture device, comprising:

a data input device to capture image data;

a data storage medium having an executable device program stored thereon;

a processor to execute the device program to generate an image data file corresponding to the image data captured by the data input device and a separate association file relating a data processing attribute with the image data, wherein the device program has a select program segment for a user to associate an attribute program segment that provides the data processing attribute before the image data is captured, and wherein the device program has an association program segment that associates the data processing attribute from the attribute program segment with the image data and generates the separate association file for storage on the data storage medium separate from the image data file, and wherein the separate association file is generated and stored separate from the image data file.

* * * * *